Dec. 10, 1963  E. E. HESTON  3,113,343
ADJUSTABLE CHOKE EXTRUDER AND DRIVE THEREFOR
Filed July 31, 1961  2 Sheets-Sheet 1

INVENTOR.
EUGENE E. HESTON
BY
Oberlin, Maky & Donnelly
ATTORNEYS

INVENTOR.
EUGENE E. HESTON

United States Patent Office 3,113,343
Patented Dec. 10, 1963

3,113,343
ADJUSTABLE CHOKE EXTRUDER AND DRIVE THEREFOR
Eugene E. Heston, Akron, Ohio, assignor to National Rubber Machinery Company, Akron, Ohio, a corporation of Ohio
Filed July 31, 1961, Ser. No. 128,177
10 Claims. (Cl. 18—12)

The present invention relates generally as indicated to an adjustable choke extruder and drive therefor, and more particularly to a drive for an extruder having an adjustable choke. See, for example, the patents to Heston 2,449,652, Buecken 2,574,907, Heston Re. 23,880, and Mallory et al. 2,970,341. The extruder herein is characterized further in that the choke is adjustable without interruption of the operation of the extruder.

In adjustable choke extruders such as depicted in the above-mentioned patents, the feed screw thereof is axially slidably keyed in a gear-driven quill or sleeve with the rear end of the feed screw bearing on an axial thrust collar screwed onto or otherwise axially adjustably secured to the quill. Therefore, it has been necessary to stop the operation of this type of extruder in order to axially adjust the position of the thrust collar on the quill thus to move the feed screw forward or to permit retraction thereof. In the Mallory et al. Pat. No. 2,970,371 it was contemplated to employ an adjustable sleeve slidably keyed in the extruder cylinder (see FIGS. 5 and 6) to make possible axial adjustment of the choke to vary the cross-section area of the choke passage while the operation of the extruder was continued. However, the adjustable sleeve aforesaid is in the material flow path, and the principles of the Mallory et al. invention are not readily adaptable for the extrusion of certain materials.

It is a principal object of this invention to provide an extruder having a feed screw which is axially adjustable during rotation thereof to vary the flow capacity of a choke defined between the feed screw and the extruder cylinder.

It is another object of this invention to provide an extruder in which the feed screw thrust member has threaded engagement with the feed screw drive quill or sleeve, said thrust collar being driven at the same speed as the drive quill except when adjustment is being made of the choke passage in the extruder.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
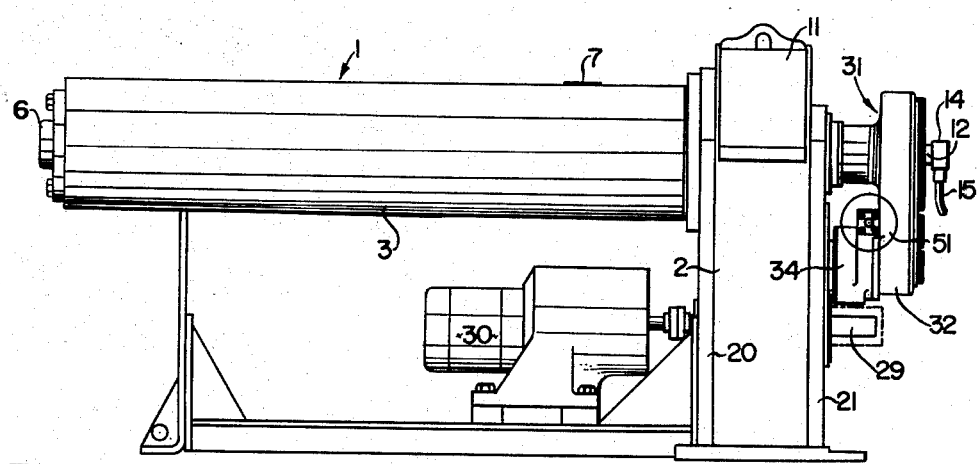
FIG. 1 is a side elevation view of an extruder embodying the present invention.
Figure 2:
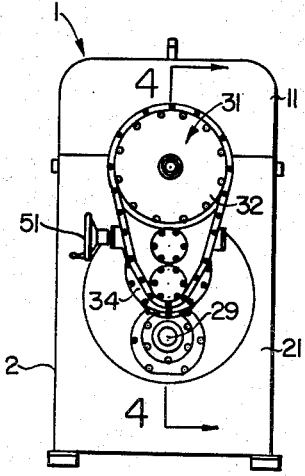
FIG. 2 is a rear elevation view of the FIG. 1 extruder.

Referring now more particularly to the drawings, and first to FIGS. 1 and 2, the extruder 1 herein comprises a base, or support frame 2, which supports the extruder barrel or cylinder 3 in which the feed screw 4 is rotated and adapted to be axially adjusted to vary the size of the choke passage 5. In the present case, the choke 5 (see FIG. 3) is disposed adjacent the die outlet end 6 of the extruder but, if desired, such choke may be disposed intermediate the feed and discharge ends of the cylinder as disclosed in the patents to Heston Re. 23,880 and Mallory et al. 2,970,341. In any event, when material is introduced into the cylinder through the feed opening 7, the rotation of the feed screw 4 in the direction indicated by the arrows in FIGS. 3 and 4 will cause the material to be advanced toward the die 6 by the helical flights 8 on the hub 9 of the feed screw 4. As is customary, the feed screw 4 will preferably be of hollow construction, as shown, for circulation of cooling medium therethrough to minimize sticking of the plastic material therearound as the material is worked and heated in the barrel or cylinder 3.

The reference numeral 11 denotes the drive head of the extruder 1 through which the feed screw 4 extends for connection of a coolant supply line at its rear end 12. Because the feed screw 4 is turning, a suitable swivel coupling 14 is required and, moreover, because the feed screw 4 is adapted to be axially adjusted, a flexible connection is employed including, for example, a flexible coolant supply hose 15. In addition, there will be provided in the feed screw a central fluid supply conduit 16 to direct the coolant against the inside of the feed screw tip 17 and thence the fluid will flow toward the rear around said conduit 16 for discharge from the rear end of the swivel coupling assembly 14.

Referring now in detail to the drive head 11 and to the choke adjusting mechanism, there is axially slidably keyed in the drive quill or sleeve 18, the feed screw 4, the latter being axially movable with respect to the drive quill 18. The drive quill 18 is journalled in antifriction bearings 19 in the front and rear walls 20 and 21 of the head 11. Keyed on the drive quill 18 between the bearings 19 is the main drive or bull gear 23 which meshes with a pinion 24 on a jack shaft 25 which is supported in the head 11 by tapered roller or like bearings 26. Keyed on the jack shaft 25 is the gear 27 which meshes with the drive pinion 28 of the main drive shaft 29. The electric drive motor 30 for the main drive shaft 29 may be coupled to either end thereof.

Secured on the rear wall 21 of the drive head 11 is the feed screw adjusting mechanism 31, the same comprising a housing 32 including in the lower portion 34 a differential type gearing of which the bevel gear 35 is keyed on the rear end of the jack shaft 25, said bevel gear 35 meshing with two or more bevel gears 36 carried on the shaft 36A extending diametrically across the cage 37, the latter being supported as in ball bearings 38.

Coaxial with the jack shaft 25 and journalled in the housing 32 is a pinion shaft 39 which, likewise, has on its inner end a bevel gear 40 meshing with the aforesaid bevel pinions 36 and being disposed coaxial with the bevel gear 35 on the jack shaft 25.

The pinion shaft 39 has a pinion gear 41 meshing with a reversing gear 42 on another jack shaft 43 journalled in the housing 32 and, in turn, the reversing gear 42 meshes with an adjusting nut gear assembly 45, the latter being formed with female screw threads 44f engaged, as shown, with corresponding male screw threads 44m on the rear end of the drive sleeve or quill 18.

The gear ratios are such that when the differential cage 37 is stationary, the nut 45 and quill 18 rotate in unison, whereby the thrust face 46 of the nut 45 remains in fixed axial position, whereby the rear head 47 of the feed screw 4 is maintained by back pressure of the plastic material in axially fixed position to maintain a constant size of choke passage 5.

In order to turn the nut assembly 45 and quill 18 with respect to each other while the quill 18 and feed screw 4 are driven, there are provided gear teeth 48 on the differential cage 37 which mesh with a pinion 49 which is turned by the worm 50 of a handwheel 51 in mesh with a worm wheel 52 keyed on the shaft 53 of the pinion 49.

Figure 3:
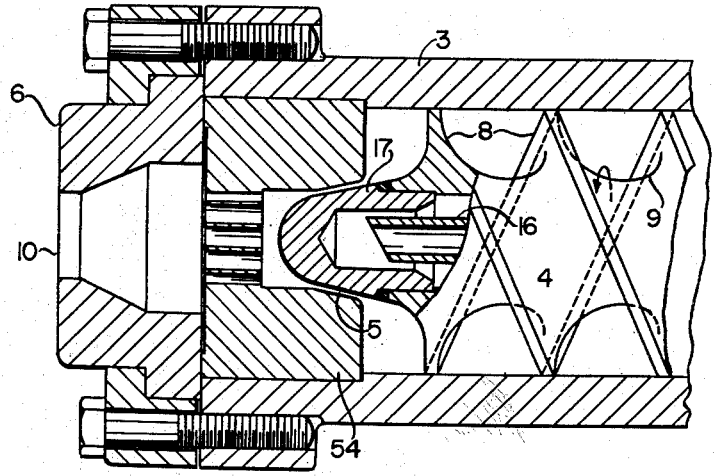
FIG. 3 is an enlarged fragmentary cross-section view through the die end of the extruder of FIG. 1.
Figure 4:
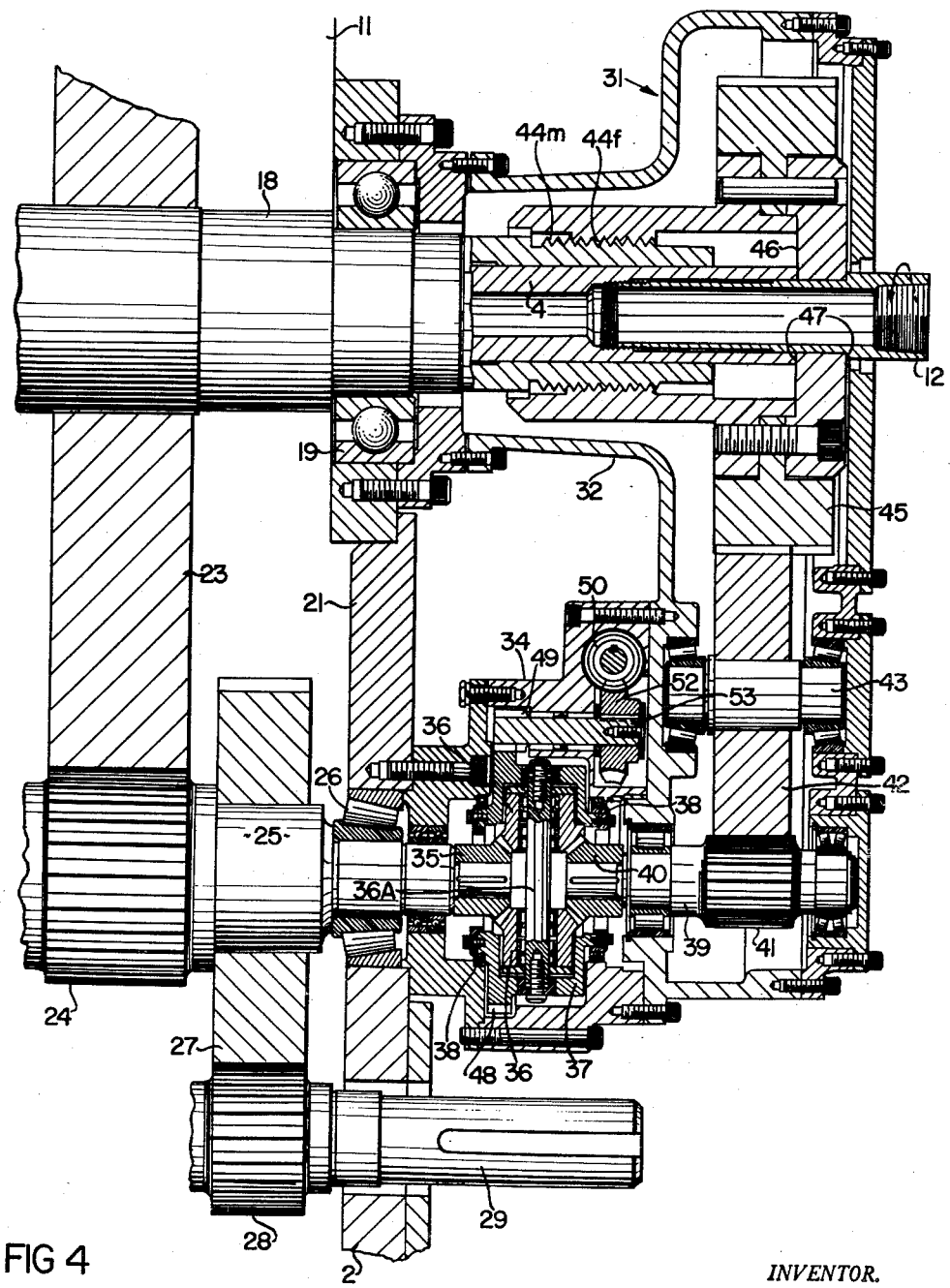
FIG. 4 is an enlarged vertical cross-section view taken substantially along the line 4—4, FIG. 2, showing the novel choke adjusting mechanism herein.

Thus, when the handwheel 51 is turned in one direction, or the other, the cage 37 is turned to effect a change in the speed of the nut gear 45 with respect to the main drive gear 23, and in this way, the nut 45 with its thrust shoulder 46 either advances toward the right, or retracts toward the left, as viewed in FIG. 3, correspondingly to change the axial position of the feed screw 4 by engagement with shoulders 47. As soon as the rotation of the handwheel 51 is stopped, the rotation of the differential cage 37 stops, whereby the nut gear 45 and drive gear 23 turn in unison to halt the feed screw 4 adjusting movement.

It can thus be seen that fine axial adjustment of the feed screw 4 may be accomplished to provide just the right size of choke passage 5 without interrupting the operation of the extruder 1. The above-described mechanism also enables extremely close adjustment of the feed screw 4 by reason of the ratios of the differential cage gear 48 and the pinion 49 and also the ratio between the worm wheel 52 and the worm 50, whereby many revolutions of the worm 50 may be made to effect just a part turn of the nut member 45 with respect to the drive gear 23.

It is to be understood that the adjustable choke 5 may be located elsewhere than at the tip 17 of the feed screw. Moreover, in some cases, the breaker plate 54 (FIG. 3) may not be required, in which event, the choke passage 5 would be defined between the tip 17 and the die 6. Upon removal of coupling 12 the feed screw 4 may be removed from the front of the extruder 1 for servicing or replacement.

Other modes of applying the principle of the invention may be employed, change being made as regards the details described, provided the features stated in any of the following claims, or the equivalent of such, be employed.

I therefore, particularly point out and distinctly claim as my invention:

1. An extruder comprising a cylinder having an inlet and an outlet for plastic material; a feed screw rotatable in said cylinder to advance plastic material from the inlet to the outlet; said cylinder and feed screw defining therebetween a choke passage which is of variable size according to the axial position of said feed screw in said cylinder and through which the plastic material flows prior to emerging from the outlet so as to build up back pressure in the material in said cylinder; a thrust member axially adjustable with respect to said cylinder and bearing axially on said feed screw to determine the axial position of said feed screw in said cylinder; said thrust member, when rotated in unison with said feed screw, being effective to maintain said feed screw in fixed axial position, and, when rotated with respect to said feed screw, being effective to change the axial position of said feed screw; and drive means for said feed screw having a power transmission coupling to said thrust member effective to drive them in unison; said power transmission coupling being actuatable to drive said thrust member at a speed different from that of said feed screw and thus to change the axial position of said feed screw in said cylinder.

2. The extruder of claim 1 wherein said drive means to said feed screw includes a drive sleeve in which said feed screw is axially slidably keyed; and wherein said thrust member has screw threaded engagement with said drive sleeve.

3. The extruder of claim 1 wherein said power transmission coupling includes a rotatable gear cage having a gear in mesh with gears operatively connected to said feed screw and to said thrust member respectively; means selectively operable to hold said cage against rotation thus to effect rotation of said feed screw and thrust member in unison and to turn said cage thus to effect rotation of said thrust member with respect to said feed screw.

4. The extruder of claim 1 wherein said power transmission coupling includes a rotatable member, which, while rotating, changes the speed of rotation of said thrust member; and self-locking gear means normally holding said rotatable member against rotation but operable to rotate the latter.

5. The extruder of claim 1 wherein said power transmission coupling includes a differential type gear unit having a planet gear cage through which said thrust member is driven in unison with said feed screw or with respect thereto according to whether said cage is held stationary or rotated; and means for turning said cage whenever it is desired to change the axial position of said feed screw in said cylinder.

6. An extruder comprising a hollow base; a cylinder secured at one end to said base and having an inlet for plastic material adjacent such one end and an outlet for plastic material at the other end; a drive sleeve axially aligned with said cylinder and journalled in said base; a feed screw rotatable in said cylinder to advance plastic material in said cylinder from said inlet to said outlet; said feed screw extending through, and axially slidably keyed in, said drive sleeve; said cylinder and feed screw defining a choke passage which is of variable size according to the axial position of said feed screw in said cylinder, and through which the plastic material flows to build up a back pressure in the material upstream of said choke passage; drive means in said base for rotating said drive sleeve, and thus said feed screw; a thrust member having screw threaded engagement with said drive sleeve and bearing axially on the end of said feed screw that extends through said drive sleeve; and power transmission means secured to said base and driven by said drive means selectively to turn said thrust member in unison with or with respect to said drive sleeve whereby, in the latter case, the axial position of said thrust member with respect to said drive sleeve is changed correspondingly to change the axial position of said feed screw in said cylinder without axial shifting of said drive sleeve.

7. The extruder of claim 6 wherein said power transmission means comprises differential gearing including a first gear driven by said drive means, a second gear coaxial with said first gear, a third gear in mesh with said first and second gears, a cage rotatably supporting said third gear and journalled in said power transmission means for orbiting of said third gear around said first and second gears, self-locking gear means engaged with said cage operative to lock said cage against rotation whereby said drive sleeve and thrust member are driven in unison through said first, second, and third gear and to turn said cage whereby the resulting orbiting of said third gear changes the speed of said thrust member.

8. The extruder of claim 7 wherein said self-locking gear means includes a worm shaft, which, when rotated turns said cage through a worm wheel in mesh with said worm shaft.

9. The extruder of claim 7 wherein said first, second, and third gears comprise bevel gears.

10. The extruder of claim 7 wherein said self-locking gear means includes a worm shaft, which, when rotated turns said cage through a worm wheel in mesh with said worm shaft; and wherein said first, second, and third gears comprise bevel gears.

References Cited in the file of this patent

UNITED STATES PATENTS

| | | |
|---|---|---|
| 2,944,286 | Kullgren et al. | July 12, 1960 |
| 2,970,341 | Mallory et al. | Feb. 7, 1961 |
| 3,007,202 | Wucher | Nov. 7, 1961 |

FOREIGN PATENTS

| | | |
|---|---|---|
| 1,091,744 | Germany | Oct. 27, 1960 |